United States Patent [19]
Walker

[11] Patent Number: 6,155,767
[45] Date of Patent: Dec. 5, 2000

[54] THREE-BATCH COAL LOADOUT SYSTEM AND METHOD

[76] Inventor: Harold A. Walker, 3406 Stoneridge Dr., Johnson City, Tenn. 37604

[21] Appl. No.: 09/523,282

[22] Filed: Mar. 10, 2000

[51] Int. Cl.$^7$ ................................................. B65G 67/22
[52] U.S. Cl. .......................... 414/329; 414/21; 414/397; 414/809; 177/DIG. 8; 177/163
[58] Field of Search ................................ 141/83, 94, 192; 222/64, 56; 177/163, 252, DIG. 8, 122, 25.13, 105, 145; 414/397, 329, 21, 323, 572, 586, 160, 185, 199, 800, 809, 328

[56] References Cited

U.S. PATENT DOCUMENTS

| | | |
|---|---|---|
| 4,284,380 | 8/1981 | Brumbaugh, Jr. et al. . |
| 4,460,308 | 7/1984 | Moon et al. . |
| 4,629,392 | 12/1986 | Campbell et al. . |
| 4,659,274 | 4/1987 | France . |
| 4,904,154 | 2/1990 | Campbell et al. . |
| 5,772,390 | 6/1998 | Walker . |
| 5,895,194 | 4/1999 | Galas et al. ............................ 414/329 |
| 5,909,999 | 6/1999 | Manstrom ........................ 414/329 X |

FOREIGN PATENT DOCUMENTS

| | | | |
|---|---|---|---|
| 1291517 | 2/1987 | U.S.S.R. ................................ 414/329 |

Primary Examiner—Frank E. Werner
Attorney, Agent, or Firm—Carter & Schnedler, P.A.

[57] ABSTRACT

A three-batch method for the precision loading of coal into the individual railroad cars of a moving train, and a loadout system implementing the method. For each railcar, three successive batches are made up and discharged from a single weigh bin. The loadout rate of a single-batch system is approached, but at a significantly reduced facility cost. The first batch is large enough to fill the front of the railcar and to establish a "plugged flow condition," allowing the second batch to be made up and discharged while maintaining a constant load profile in the railcar. After the weigh bin is emptied of the second batch, the third batch is made up and discharged. The third batch is made up with greater precision than the first and second batches.

9 Claims, 8 Drawing Sheets

THREE-BATCH COAL LOADOUT SYSTEM AND METHOD

BACKGROUND OF THE INVENTION

The invention relates generally to precision loadout systems for loading coal or other particulate material into a moving train of railroad cars and, more particularly, to multiple-batch systems and methods which achieve acceptably high loading rates with smaller, and therefore less costly, facilities.

For economic reasons it is desirable to accurately load railroad cars to target weights very near the respective maximum weight capacities of the individual cars. Overloading a railroad car is undesirable because equipment damage can result. Underloading is undesirable because railroad car capacity is not efficiently utilized, and economic penalties can result.

As is for example disclosed in Campbell et al U.S. Pat. No. 4,629,392, a typical prior art loadout system for loading railroad cars with coal includes a relatively larger surge bin positioned above a relatively smaller weigh bin. Below the surge bin is a controlled charging gate for charging batches of coal from the surge bin into the weigh bin. The weigh bin is mechanically supported on load cells, such that the weight of the weigh bin and coal contained therein can be determined. Below the weigh bin is a controlled discharge gate for discharging coal from the weigh bin through a loading chute into the railroad cars as they travel past below. The surge bin is supplied by a conveyor system which runs substantially continuously while the train is traveling below past the loadout system, at a conveyor rate consistent with the average loading rate as successive railroad cars of the moving train, traveling for example at a speed of one-half mile per hour to one mile per hour (0.8 km/hr to 1.6 km/hr), are loaded.

During operation of a typical prior art coal loadout system, the charging gate is opened to charge from the surge bin into the weigh bin a batch of coal having a weight equal to the target weight of coal to be loaded into an individual railroad car, thereby making up a weighed batch of coal. Then, as the railroad car reaches its proper position below the weigh bin and loading chute, the discharge gate is opened, commencing the discharge of the weighed batch of coal from the weigh bin into the railroad car. Ideally, coal flows continuously into the railroad car, filling each railroad car evenly from front to back.

As an example, a typical prior art loadout system loads a moving train at a rate of 6,000 tons per hour (5,400 metric tons per hour). For loading railroad cars of 120 tons (109 metric tons) capacity, a weigh bin of 130 tons (118 metric tons) capacity may be provided, and a surge bin of 300 tons (272 metric tons) capacity. The capacity of the surge bin is thus sufficient to reliably and quickly charge the weigh bin with successive batches of coal as the railroad cars pass below the loadout system, without ever becoming empty. The conveyor supplying the surge bin runs continuously while a train is being loaded, and delivers coal at a corresponding rate of, for example, 6,000 tons per hour (5,400 metric tons per hour).

In order to reduce the storage capacities and therefore the size and cost of the surge bin and weigh bin, two-batch and four-batch coal loadout systems have previously been implemented. In a two-batch system, as each railroad car passes below the loadout system, the first batch of coal is discharged from the weigh bin. After the weigh bin is empty, but while coal is still flowing out of the discharge chute, the weigh bin is recharged from the surge bin to make up the second batch. The second batch is then discharged into the same railroad car. The precision to which the second batch can be made up to a particular weight determines the accuracy of loading the railcar. In a four-batch system, as each railroad car passes below the loadout system, the weigh bin is recharged three times, in addition to the initial batch. The precision to which the fourth batch can be made up to a particular weight determines the accuracy of loading the railcar.

Prior art multiple-batch coal loadout systems however suffer the disadvantage of greatly reduced loading rates. For example, a two-batch system might have the capability of loading coal at a rate of 3,000 tons per hour (2,700 metric tons per hour), while a four-batch system might have the capability of loading coal at a rate of only 2,000 tons per hour (1,800 metric tons per hour). The loading rate of a multiple-batch system is limited by a number of factors, including the time required to charge the weigh bin with successive batches without interrupting the continuous flow of coal from the discharge chute into each railroad car.

Thus a requirement is that a loadout system be capable of evenly loading the entire required amount of coal in each railroad car while the train is moving at a constant rate. This requirement particularly limits a multiple-batch loadout system which must be capable of making and weighing successive batches in a manner such that there is no gap in the flow into the railroad cars. With a double batching system, it is difficult to make the second batch up fast enough to avoid gaps in flow out of the loading chute while the railroad car is moving due to the size of the batch required and the requirement that the second batch be made up very accurately. In general, with a multiple-batch loadout system, as the size of the final batch increases, the loadout rate and therefore the train speed decreases, because it takes more time to make up a batch with precision, as is described in detail hereinbelow. But a limitation of a four-batch system is that the train speed cannot be constant, because the smaller first batch is insufficient to fill the front of a railroad car, and it may be necessary to slow or stop the train while the second batch is made up and discharged.

SUMMARY OF THE INVENTION

Accordingly, there is a particular need for loadout systems which, in order to reduce the size and cost of the facility required, implement multiple batching, and which also achieve loadout rates approaching that of a single-batch system.

Embodiments of the invention implement a three-batch method. Somewhat surprisingly, during a detailed examination of the dynamics of rapid precision railcar loading systems, it was discovered that a three-batch system embodying the invention, with proper selection of batch and therefore bin sizes, can achieve loadout rates significantly higher than either a two-batch or a four-batch system, approaching that of a single-batch system, but at a lower facility cost compared to that of either a single-batch system or a double-batch system. The selection of bin sizes and various factors to be taken into account in implementing an economical three-batch loadout system are discussed hereinbelow in the "Detailed Description."

In an exemplary embodiment of the invention, a loadout system for loading successive railroad cars of a moving train with respective target weights of particulate material, such as coal, includes a surge bin and a weigh bin positioned below the surge bin. There is at least one transducer connected to the weigh bin for measuring the weight of the weigh bin and particulate material contained therein, and the transducer has a weighing transducer output. Positioned below the weigh bin is a loading chute having a discharge end for conveying particulate material from the weigh bin into the railroad cars. For charging batches of particulate material from the surge bin into the weigh bin there is a controlled charging gate, and for discharging particulate material from the weigh bin there is a controlled discharge gate. A controller is connected to the transducer output for determining the weight of the weigh bin and particulate material contained therein, is connected to the charging gate for controlling the charging of the weigh bin, and is connected to the discharge gate for controlling discharging from the weigh bin.

The controller is operable, as an individual railroad car approaches the loading chute, to open the charging gate, while monitoring the weighing transducer output, so as to charge the weigh bin with a first weighed batch of material. The first weighed batch is sufficient to fill a front portion of the individual railroad car up to the discharge end of the loading chute so that subsequent flow of material out of the loading chute is controlled by forward movement of the individual railroad car and to leave a quantity of material in the loading chute sufficient to maintain a continuous flow of material into the individual railroad car during an interval between when the weigh bin is emptied of the first batch and the weigh bin is charged with a second weighed batch of material, and then to close the charging gate. The controller is further operable to open the discharge gate, and then to close the discharge gate when the weigh bin is empty. The controller is further operable, while material from the first batch is flowing from the loading chute into the individual railroad car, to open the charging gate, while monitoring the weighing transducer output, so as to charge the weigh bin with the second weighed batch. The weight of the second batch is a portion of the remaining material weight required to reach the target weight for the individual railroad car after the first weighed batch is loaded into the individual railroad car, and the second weighed batch additionally is sufficient to leave a quantity of material in the loading chute sufficient to maintain a continuous flow of material into the individual railroad car during an interval between when the weigh bin is emptied of the second batch and the weigh bin is charged with a third weighed batch of material, and then to close the charging gate. The controller is further operable to again open the discharge gate, and to close the discharge gate when the weigh bin is empty. The controller is further operable, while material from the second batch is flowing from the loading chute into the individual railroad car, to open the charging gate, while monitoring the weighing transducer output, so as to charge the weigh bin with the third weighed batch, and then to close the charging gate, preferably in stages so as to charge the third batch with greater precision than the first and second batches. The weight of the third batch is what is required to reach the target weight for the individual railroad car after the first and second weighed batches are loaded into the individual railroad car. The controller is further operable to yet again open the discharge gate, and then to close the discharge gate when the weigh bin is empty.

The loadout system, and the corresponding method, have a number of advantages. Compared to a single-batch loadout system, a smaller facility is required, which accordingly costs less. A three-batch system embodying the invention and capable of loading coal at a rate of 6,000 tons per hour (5,400 metric tons per hour) can be constructed at a cost considerably lower than the cost of a single-batch loadout system with the same capacity. For example, compared to a single-batch system including a surge bin of 300 tons (272 metric tons) capacity and a weigh bin of 130 tons (118 metric tons) capacity, the invention can be embodied in a system including a surge bin of 150 tons (136 metric tons) capacity, and a weigh bin of 45 tons (41 metric tons) capacity. In addition, because the overall height is reduced due to the smaller surge bin and weigh bin, such as a height reduction of twenty feet (6 meters), a shorter conveyor system can be installed for supplying the surge bin, saving perhaps sixty feet (18 meters) of conveyor length, thereby reducing both the initial capital cost and future operating costs, as less electrical power is required to lift coal to fill the surge bin.

A three-batch system embodying the invention achieves far higher loadout rates than either a two-batch or four-batch system, approaching the loadout rate of a single-batch system, but at a significantly reduced facility cost compared to either a single-batch or a two-batch system.

DETAILED DESCRIPTION

Figure 1:
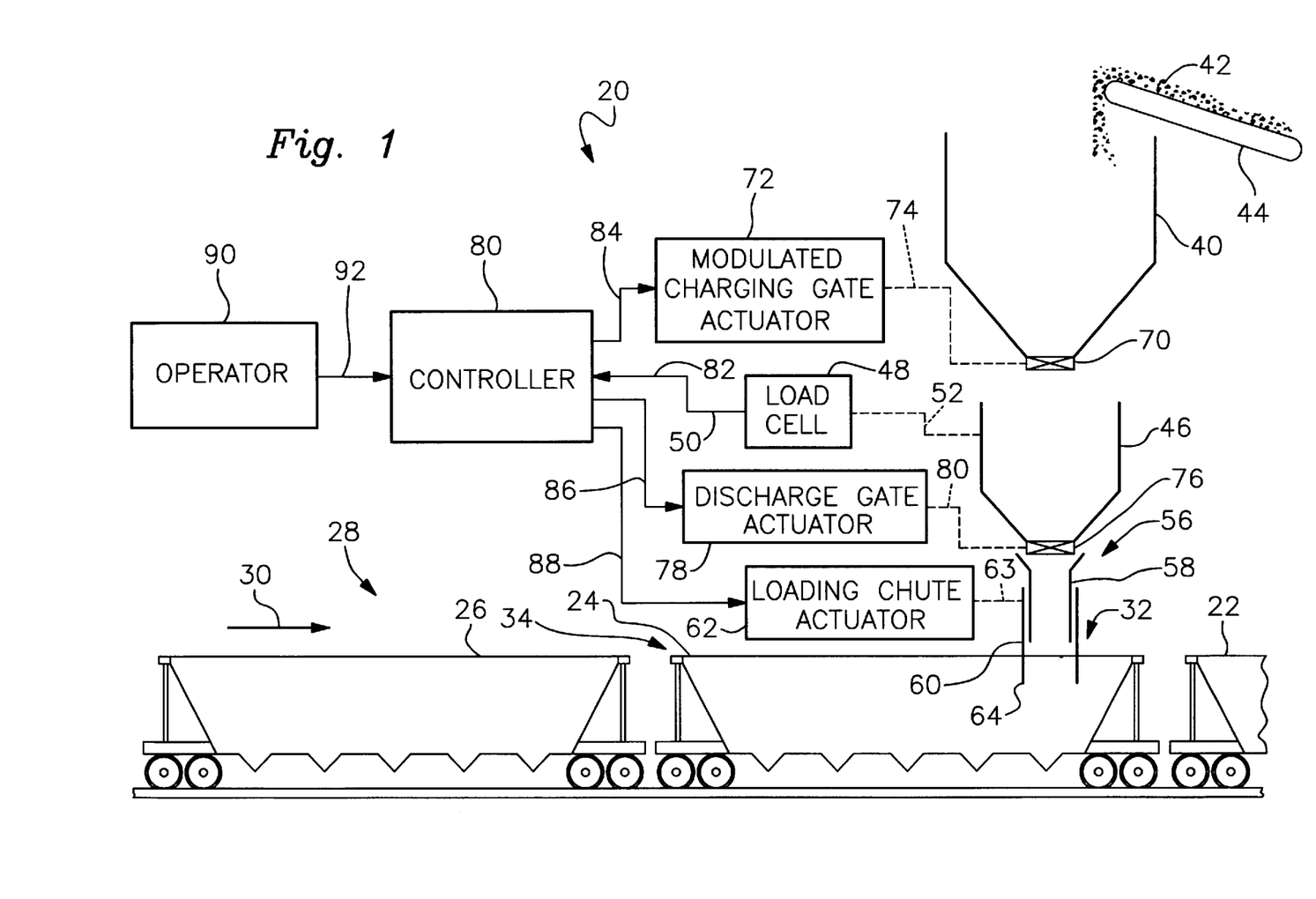
FIG. 1 is a highly schematic representation of a loadout system embodying the invention.

Referring first to FIG. 1, schematically depicted is a loadout system, generally designated 20, for loading successive railroad cars such as representative cars 22, 24 and 26 of a moving train 28 with respective target weights of particulate material, in the disclosed embodiment, coal. (In general, the coal itself is depicted only in FIGS. 2–8, which depict operation of the loadout system 20, as described hereinbelow.) In the orientation of FIG. 1, the train 28 is moving from left to right, as indicated by an arrow 30, at a substantially constant rate within the approximate range of one-half mile per hour to one mile per hour (0.8 km/hr to 1.6 km/hr), while coal is loaded into the representative railroad cars 22, 24 and 26. Thus, the representative railroad car 24 has a front portion 32 and a rear portion 34. In FIG. 1, the railroad car 22 is fully loaded, the railroad car 24 is being loaded, and the railroad car 26 is empty, as it approaches the loadout system 20. By way of example and not limitation, the railroad cars 22, 24 and 26 each have a typical capacity of 120 tons (109 metric tons) of coal.

The loadout system 20 includes a surge bin 40 of conventional construction, and supported above the ground by a support structure (not shown). By way of example and not limitation, the surge bin 40 has a capacity of 150 tons (140 metric tons) of coal, a diameter of twenty-five feet (8 meters), and an overall height of approximately twenty-two feet (7 meters), extending from approximately forty-one feet (12 meters) above the ground to approximately sixty-three feet (19 meters) above the ground.

For supplying the surge bin 40 with coal 44 on a substantially continuous basis there is a particulate transport system 44 in the form of a conventional conveyor 44. The conveyor 44 delivers coal at a rate, by way of example and not limitation, of 6,000 tons per hour (5,400 metric tons per hour). The conveyor 44 operates continuously during the loading of the individual railroad cars of the train 28, and the surge bin 40 is never completely empty during the process of loading the cars of the train 28, as represented in FIGS. 2–8 which depict operation of the loadout system 20, by a reservoir of coal 45 in the surge bin 40. Still referring to FIG. 1, the feed rate of the conveyor 44 is variable so as to match what is required during the loading of a particular train 28.

Positioned below the surge bin. 40 is a weigh bin 46, likewise of conventional construction, and supported above the ground by the support structure (not shown). By way of example and not limitation, the weigh bin 46 has a capacity of forty-five tons (41 metric tons) of coal, a diameter of seventeen feet six inches (5 meters), and an overall height of approximately fifteen feet (4.5 meters), extending from approximately twenty-five feet (8 meters) to approximately forty feet (12 meters) above the ground. Likewise in a conventional manner, the weigh bin 46 is mounted such that the weight of the weigh bin 46 and the coal contained therein is supported by or otherwise transferred to at least one transducer 48, such as a load cell 48, having a weighing transducer output 50. In the schematic representation of FIG. 1, a dash line 52 represents a mechanical connection between the load cell 48 and the weigh bin 46 whereby the weight of the weigh bin 46 and coal contained therein is measured.

Positioned below the weigh bin 46 is a telescoping loading chute 56 for conveying coal from the weigh bin 46 into the individual railroad cars, such as the exemplary railroad car 24. The telescoping loading chute 56 is of conventional construction, and has a fixed upper section 58 and a vertically movable lower section 60 controlled by a loading chute actuator 62 comprising a plurality of hydraulic cylinders, via a mechanical connection represented by dash line 63. The lower section 60 of the loading chute 56 has a discharge end 64, from which coal flows during a loadout operation. By way of example and not limitation, the loading chute 56 is six feet (1.8 meters) square in cross section and has an overall height of approximately thirteen feet (4 meters), extending, when the lower section 60 is fully lowered, from approximately ten feet (3 meters) above the ground to approximately twenty-four feet (7 meters) above the ground. The lower section 60 of the loading chute 56 has a vertical travel of approximately three feet (1 meter), and can be raised above the gunwale of the representative railroad car 24 to allow the ends of the car 24 to pass by, and can be lowered into the representative railroad car 24 during a loadout operation.

Once a loading operation is underway, a so-called "plugged flow condition" is achieved, as is described hereinbelow with reference to FIG. 4, whereby a portion of the railroad car 24 under the loading chute 56 is filled with coal substantially up to the discharge end 64 of the loading chute 56 such that the rate of flow out of the loading chute 56 into the railroad car 24 is effectively controlled by forward movement of the train 28 at a rate, for example, of 4,000, 5,000 or 6,000 tons per hour (3,600, 4,500 or 5,400 metric tons per hour). Thus, in addition to its function as a conduit, the loading chute 56 serves a buffering function. The capacity of the loading chute 56 when completely filled during a "plugged flow condition" is approximately ten tons (9 metric tons).

For charging batches of coal from the surge bin 50 into the weigh bin 46 there is a controlled charging gate 70, operated by a modulated charging gate actuator 72, typically comprising a plurality of hydraulic cylinders and associated control valves, via a mechanical connection represented by dash line 74. The charging gate 70 may be of any suitable construction, having for example two or four blades. To achieve precision batching as is described hereinbelow with reference to FIG. 7, the charging gate 70 is capable of selective opening sizes in order to modulate the flow of coal into the weigh bin 46, as is known in the art. By way of example and not limitation, the charging gate 56 may have a maximum opening size of thirty-six square feet (3.3 $mm^2$) (six feet (1.8 meters) by six feet (1.8 meters) square), and can charge the weigh bin 46 with coal at a rate of five to seven tons per second (4.5 to 6.3 metric tons per second), thereby charging the weigh bin 46 with forty-five tons (41 metric tons) of coal in about seven seconds.

Similarly, below the weigh bin 46 there is a controlled discharge gate 76, operated by a discharge gate actuator 78, also comprising a plurality of hydraulic cylinders and associated control valves, via a mechanical connection represented by dash line 80. The discharge gate 76 may be of conventional construction, having an area of approximately thirty-six square feet (3.3 $mm^2$) (six feet (1.8 meters) by six feet (1.8 meters) square), and capable of discharging coal into the loading chute 56 at an approximate rate of five to seven tons per second (4.5 to 6.3 metric tons per second).

The loadout system 20 additionally includes a controller 80, such as a suitably-configured and programmed Allen-Bradley controller in combination with a suitably-programmed PC type computer. In a conventional manner, the controller 80 is connected via a representative line 82 to the weighing transducer output 50 so that the weight of the weigh bin 46 and its contents can be determined. In addition, the controller 80 is connected via representative control lines 84 and 86 to the charging gate actuator 72 and discharge gate actuator 78, so as to control the charging and discharging of the weigh bin 46. By another representative control line 88 connected to the loading gate actuator 62, the controller 80 controls the raising and lowering of the lower section 60 of the loading chute 56. It will be appreciated that the lines 82, 84, 86 and 88 are representative of any suitable technique by which data and control signals may be communicated, including, as examples, data multiplexing, techniques based on computer networking, as well as wireless links.

The overall operation is initiated and at least monitored by a human operator 90, who directs the overall operation of the controller 80 by means of a representative control input 92. The control input 92 is representative of various input devices, including, as examples, a keyboard, pushbuttons, switches and joysticks.

As is well known in the art, the loadout system 20 in addition includes a number of conventional control elements such as limit switches and other sensors, including various protective devices, for efficient and reliable operation of the loadout system 10. These include sensors (not shown) for monitoring the level of coal in the surge bin 40, as well as readers for reading identifying numbers from the individual railroad cars, such as bar-coded identifying numbers. In addition, there is equipment for handling test weights for weigh bin calibration purposes, as also is known in the art. In general, all the operator 90 has to do is to watch the railroad cars 24 as they approach the loading chute 56, and trigger the discharge gate 76 while causing the lower section 60 of the loading chute 56 to be lowered into the railroad car, and thereafter causing the lower section 60 of the loading chute 56 to be raised to an appropriate height for loading coal into the representative car 24. As each car is loaded, the lower section 60 of the loading chute 56 must be raised so as to clear the gunwale, which can be done either under direction of the operator 90 visually monitoring the process, or triggered automatically by a limit switch or other protective device.

The controller 80, under direction of the operator 90, is operable to control operation of the loadout system to implement a three-batch method embodying the invention for loading successive railroad cars, such as the representative railroad car 24, as is described next hereinbelow.

Figure 2:
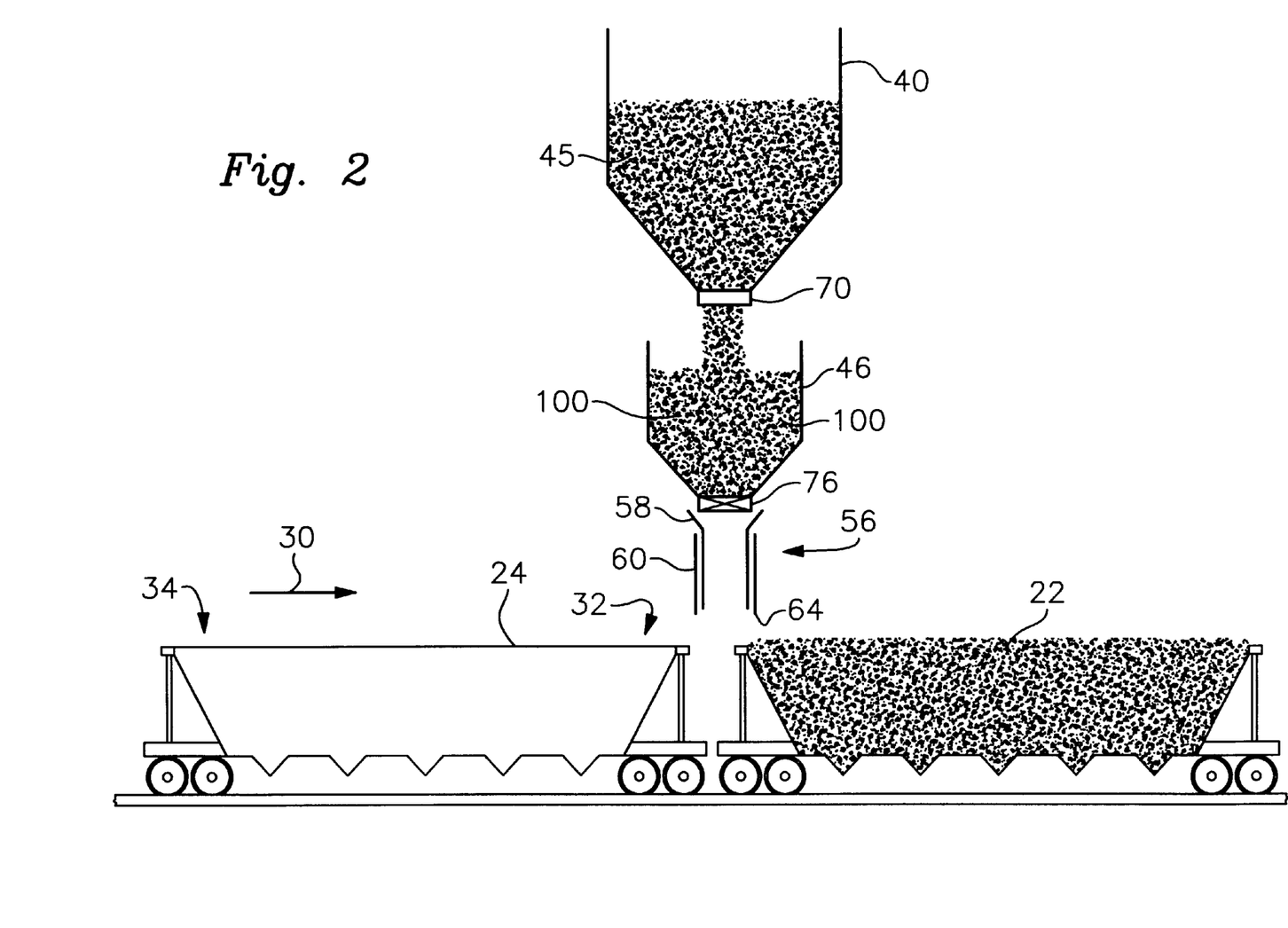
FIG. 2 depicts a condition during operation when the weigh bin is being loaded with the first batch of coal as a railroad car to be loaded approached.

With reference in addition to FIG. 2, as the representative railroad car 24 approaches the loading chute 56 (with the lower section 60 raised to clear the cars 22 and 24), the charging gate 70 is opened, while the load cell 48 output 50 is monitored, so as to charge the weigh bin 46 with a first weighed batch 100 of coal. When the first weighed batch 100 is made up, the charging gate 70 is closed. A relatively long time interval is available to thus make up the first weighed batch 100, for example twenty seconds, between when the weigh bin 46 has been emptied of the third batch of the previously-loaded railroad car 22 as described hereinbelow with reference to FIG. 8, and the front end of the railroad car 24 to be loaded arrives under the loading chute 56. Moreover, while the first batch 100 must be weighed accurately, there is no requirement that it be precisely made up to a particular weight.

Figure 3:
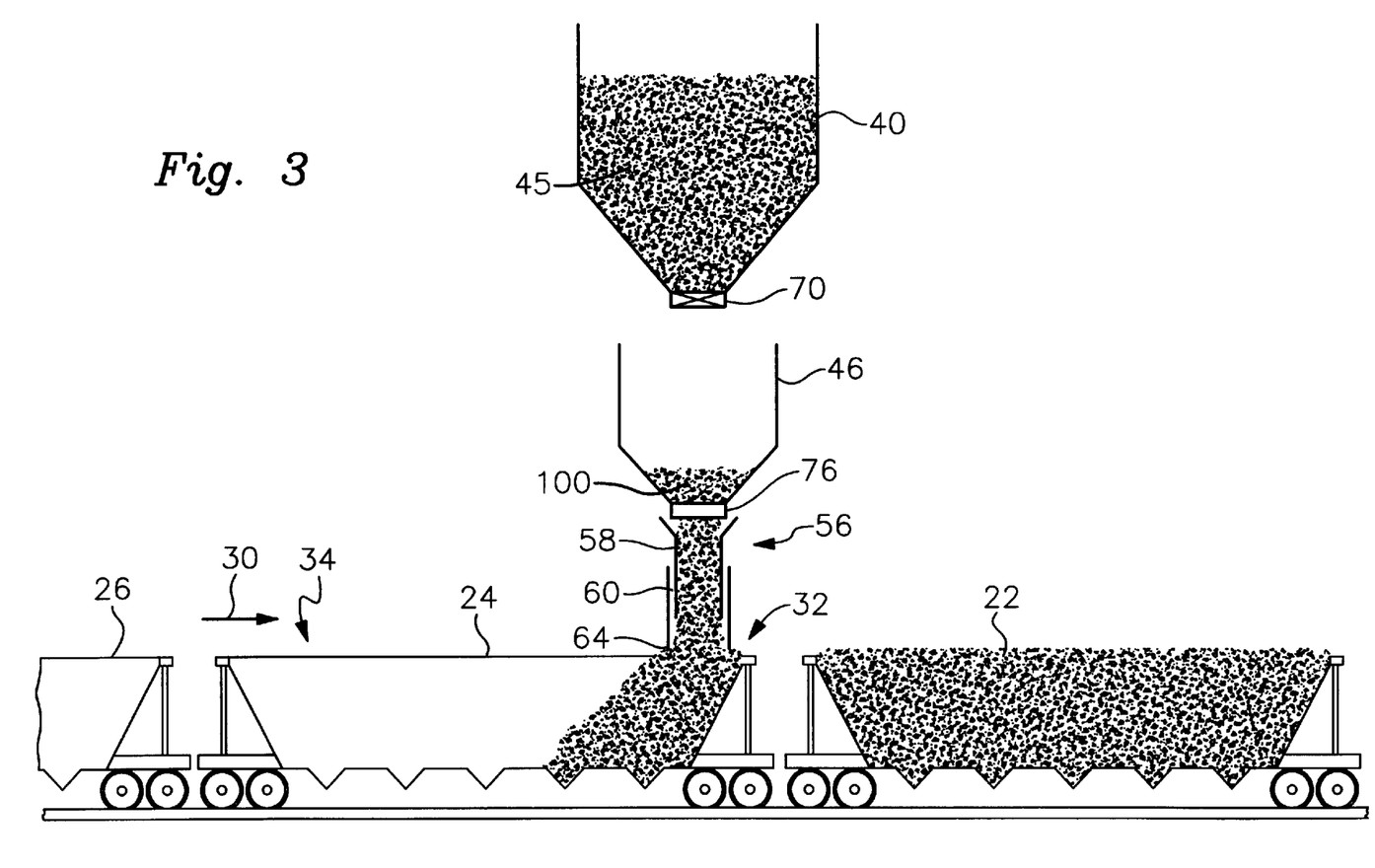
FIG. 3 depicts the first batch being discharged into the initially-empty railroad car.
Figure 4:
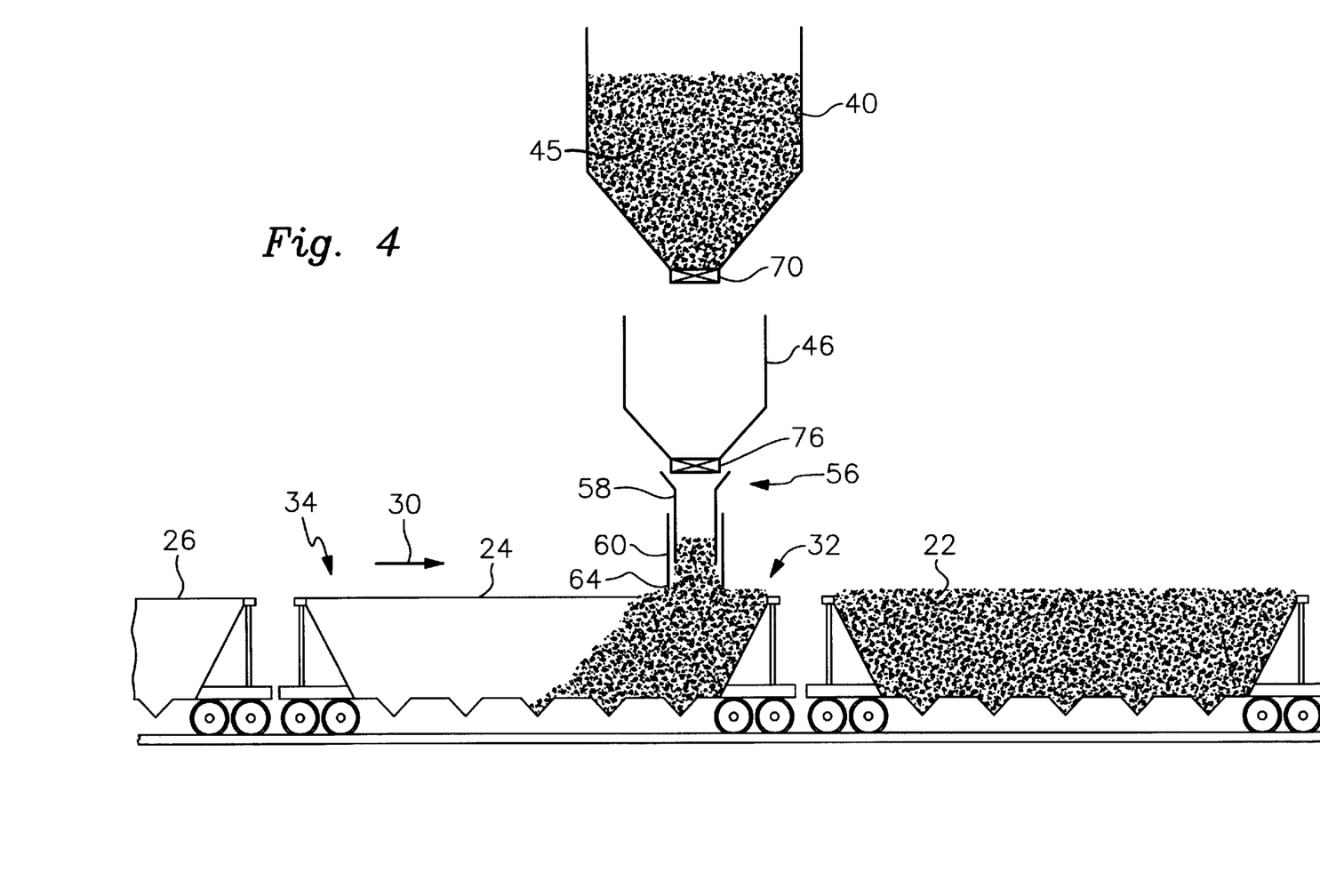
FIG. 4 depicts a condition during operation when the weigh bin is emptied of the first batch, with coal remaining in the loading chute, and the front portion of the car is filled up to the discharge end of the loading chute so as to achieve a "plugged flow condition;"

FIG. 3 depicts the first weighed batch 100 being discharged into the front portion 34 of the car 24 prior to the level of coal in the car 24 reaching the discharge end 64 of the loading chute (with the lower section 60 now lowered), and FIG. 4 depicts a condition when the weigh bin 46 is emptied of the first weighed batch 100. In FIG. 4, coal remains in the loading chute 56, and the front portion 32 of the railroad car 24 is filled up to the discharge end 64 of the loading chute 56 so that subsequent flow of coal out of the loading chute 56, in a "plugged flow condition," is controlled by forward movement of the individual railroad car 24.

In addition to the first weighed batch 100 being sufficient to load the front portion 32 of the initially-empty railroad car 24 all the way up to the discharge end 64 of the loading chute 56 so as to achieve a "plugged flow condition," the first weighed batch 100 is sufficient to leave enough coal in the loading chute 56 so as to maintain a continuous flow of coal out of the loading chute 56 during an interval between when the weigh bin 46 is emptied of the first batch 100 and the weigh bin 46 is charged with a second batch 102 (FIG. 5), and the discharge gate 76 opened to begin discharge of the second batch 102. Accordingly, a constant load profile is maintained in the railroad car 24. Still referring to FIGS. 3 and 4, when the weigh bin 46 is completely emptied of the first batch 100, as determined by the load cell 58 or by another appropriate sensor, the discharge gate 76 is closed.

Figure 5:
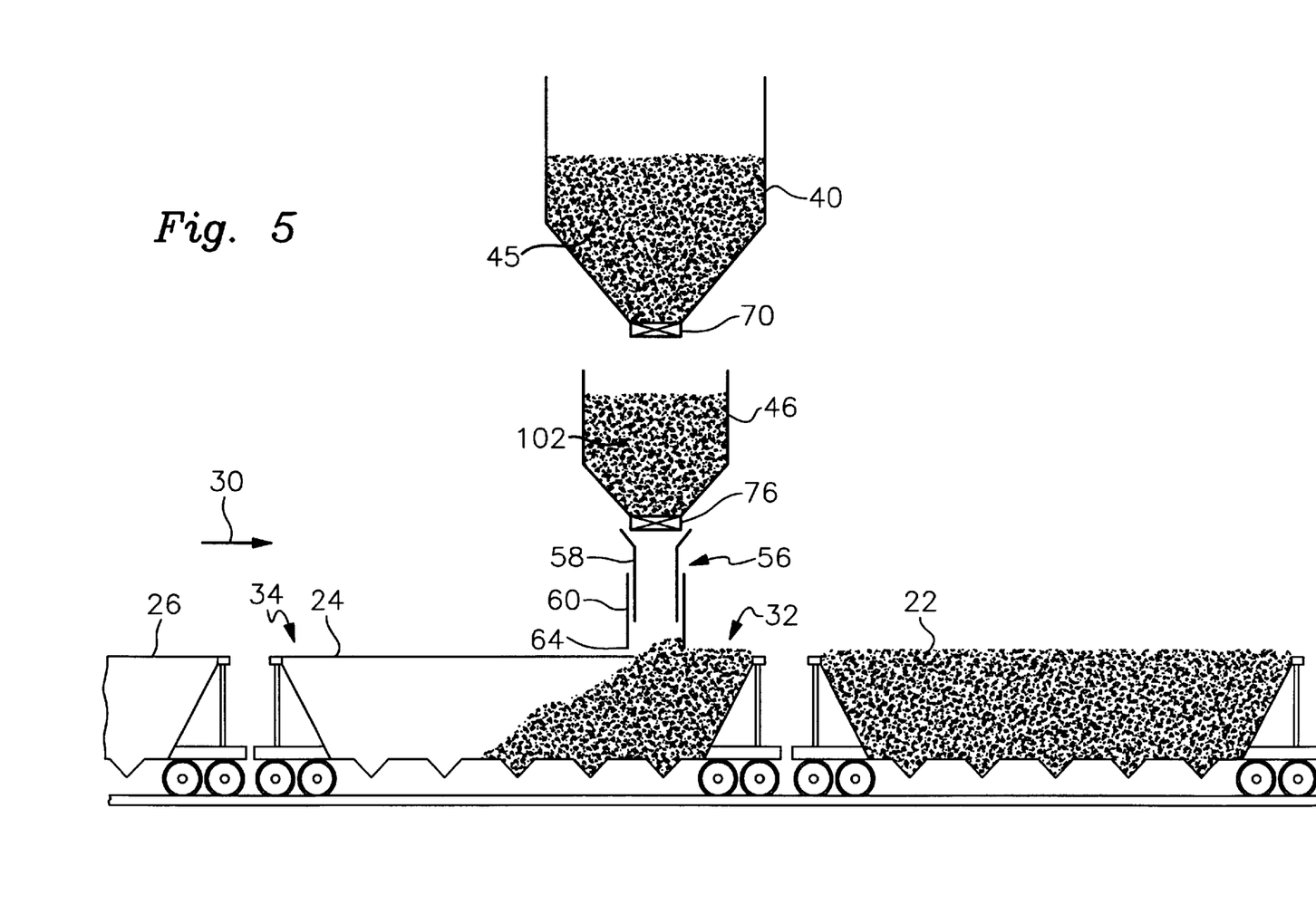
FIG. 5 depicts a condition during operation when the second batch has been made up in the weigh bin.

FIG. 5 depicts the condition when the second batch 102 has been made up in the weigh bin 46, immediately prior to the discharge gate 76 being opened to discharge the second batch 102, and while coal from the first batch 100 is still flowing out of the loading chute 56. Thus, and leading up to the FIG. 5 condition, while material from the first batch 100 (FIG. 2) is still flowing from the loading chute 56 into the individual railroad car 24, the charging gate 70 is again opened, again while monitoring the load cell 48 output 50, so as to charge the weigh bin 46 with the second weighed batch 102 of material. When the second batch 102 is made up, the charging gate 70 is closed. Thereafter, and before the loading chute 56 is empty, the discharge gate 76 is opened so as to discharge the second batch 102, all the while maintaining a constant load profile in the railroad car 24.

The weight of the second batch 102 is a portion, for example but not necessarily, one-half, of the remaining material weight required to reach the target weight for the individual railroad car after the first weighed batch 100 is loaded into the railroad car 24. In addition, the second weighed batch 102 is sufficient to leave a quantity of material in the loading chute 56 sufficient to maintain a continuous flow of coal out of the loading chute 56 into the railroad car 24 during an interval between when the weigh bin 46 is emptied of the second batch 102, and the weigh bin is charged with a third weighed batch 104 (FIG. 7) of coal and discharge of the third weighed batch 104 commenced. Like the first batch 100, the second batch 102 must be weighed accurately, but there is no requirement that it be precisely made up to a particular weight.

Figure 6:
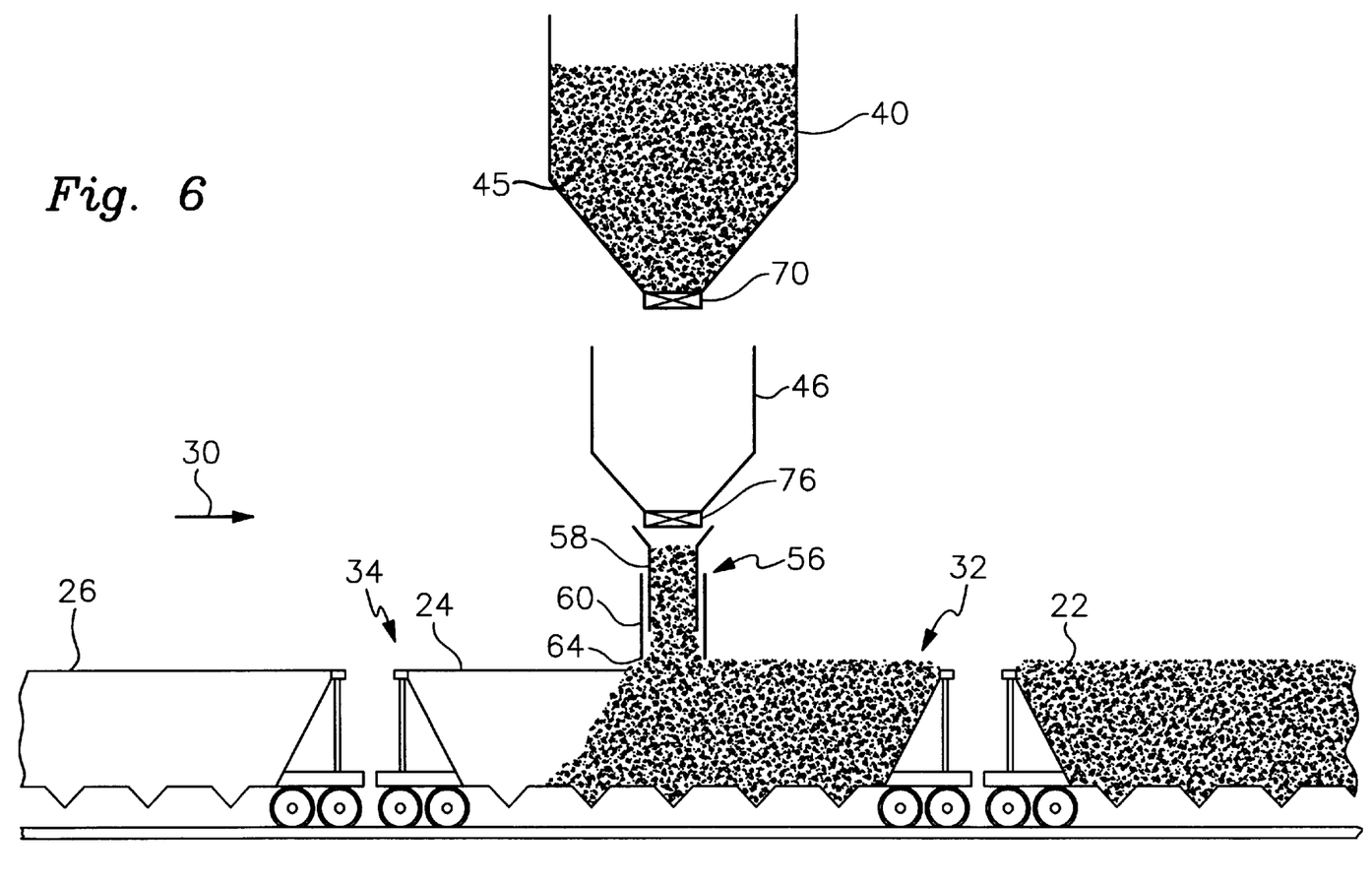
FIG. 6 depicts a condition during operation when the weigh bin is emptied of the second batch, with coal remaining in the loading chute, and a "plugged flow condition" maintained.

FIG. 6 depicts the condition when the weigh bin 46 has been emptied of the second weighed batch 102, immediately prior to the third weighed batch 104 (FIG. 7) being made up. In FIG. 6, the discharge gate 76 is closed. The loading chute 56 is nearly full, allowing a "plugged flow condition" to be maintained without undue criticality while the third batch 104 (FIG. 7) is made up.

Figure 7:
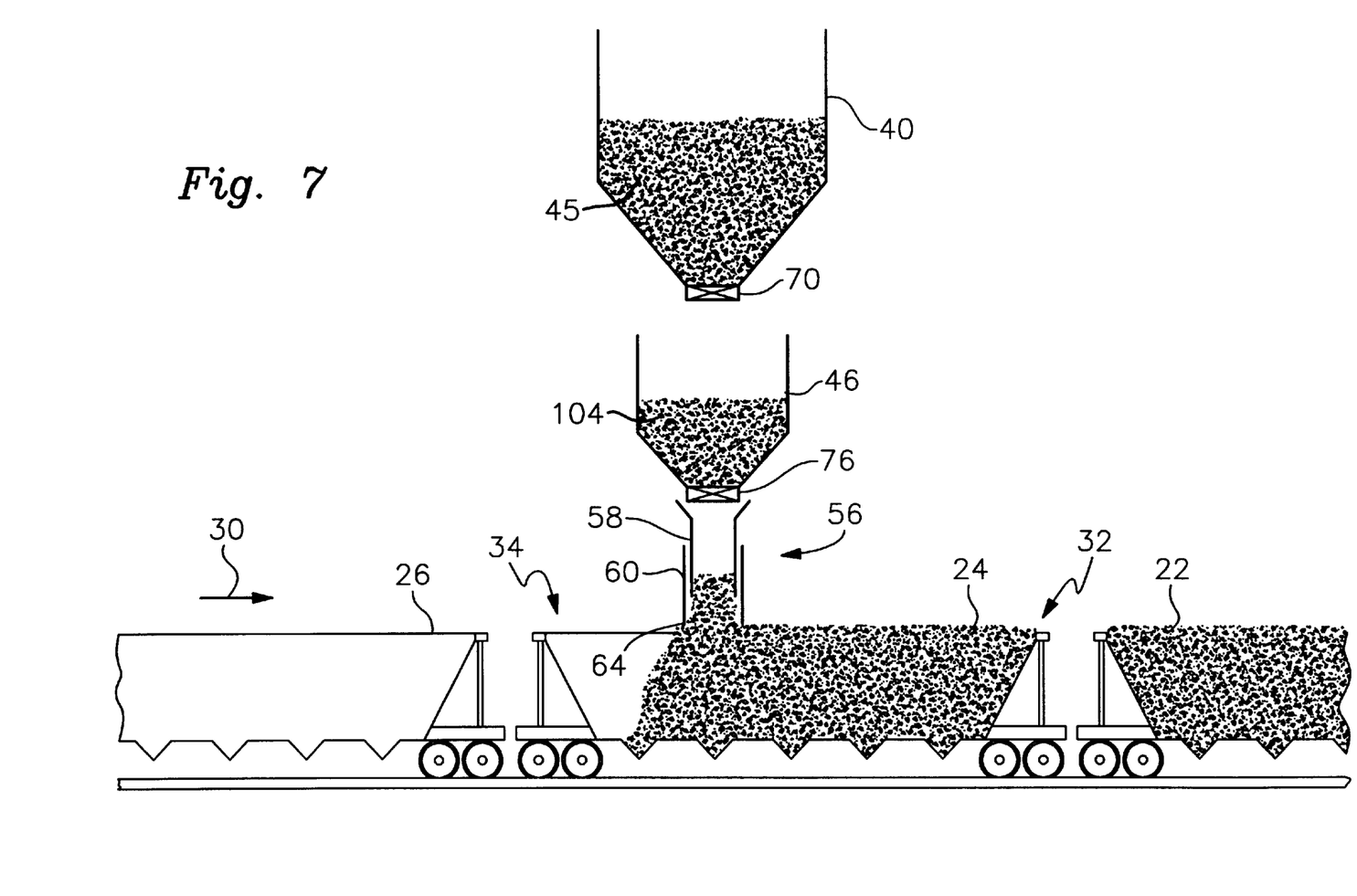
FIG. 7 depicts a condition during operation when the third batch has been made up in the weigh bin.

FIG. 7 more particularly depicts the condition when the third batch 104 has been made up in the weigh bin 46, immediately prior to the discharge gate 76 being opened to discharge the third batch 104, and while coal from the second batch 102 is still flowing out of the loading chute 56. Compared to FIG. 5, which shows the condition immediately prior to discharge of the second batch 102, in FIG. 7 a greater quantity of coal remains in the loading chute 56. Thus, and leading up to the FIG. 7 condition, while material from the second batch 102 is still flowing from the loading chute 56 into the railroad car 24, the charging gate 70 is opened for a third time, again while monitoring the weighing transducer output 50 of the load cell 48, so as to charge the weigh bin 46 with the third weighed batch 104 of coal. The weight of the third batch 104 is what is required to reach the target weight for the individual railroad car 24 after the first 100 and second 102 weighed batches are loaded into the railroad car 24.

Making up the third weighed batch 104 differs significantly from making up the first and second weighed batches 100 and 102 because the accuracy to which the third batch can be made up to a particular weight is critical to the overall accuracy of loading the railcar 24. Thus, the first and second batches 100 and 102 are each weighed accurately, but there is no requirement that they be with precision made up to a particular weight. The combined weight of the first and second batches 100 and 102 is subtracted from the target weight for the railroad car 24 to calculate the required weight for the third batch 104, which is then made up with as much precision as possible. In order to precisely make up the third batch, the charging gate 70 is closed in stages so that coal initially flows rapidly into the weigh bin 46, and the rate of flow diminishes as the weight of coal in the weigh bin 46 approaches what is required for the third batch 104. More precise shut off is therefore possible. In practice this is achieved by programming a plurality of weight set points. As each set point is reached one or more elements of the charging gate 70 are closed, and the charging gate 70 is completely closed when the last set point is reached. Alternatively, a single charging gate 70 element can be moved in stages, until completely closed. Precision batching can be achieved with as few as two set points.

However a penalty associated with precision batching is that the time to make up the batch is typically increased by approximately five seconds.

After the third weighed batch 104 is made up the charging gate 70 is closed, but before the loading chute 56 is empty, the discharge gate 76 is opened so as to discharge the third batch 104, again all the while maintaining a constant load profile in the railroad car 24.

Figure 8:
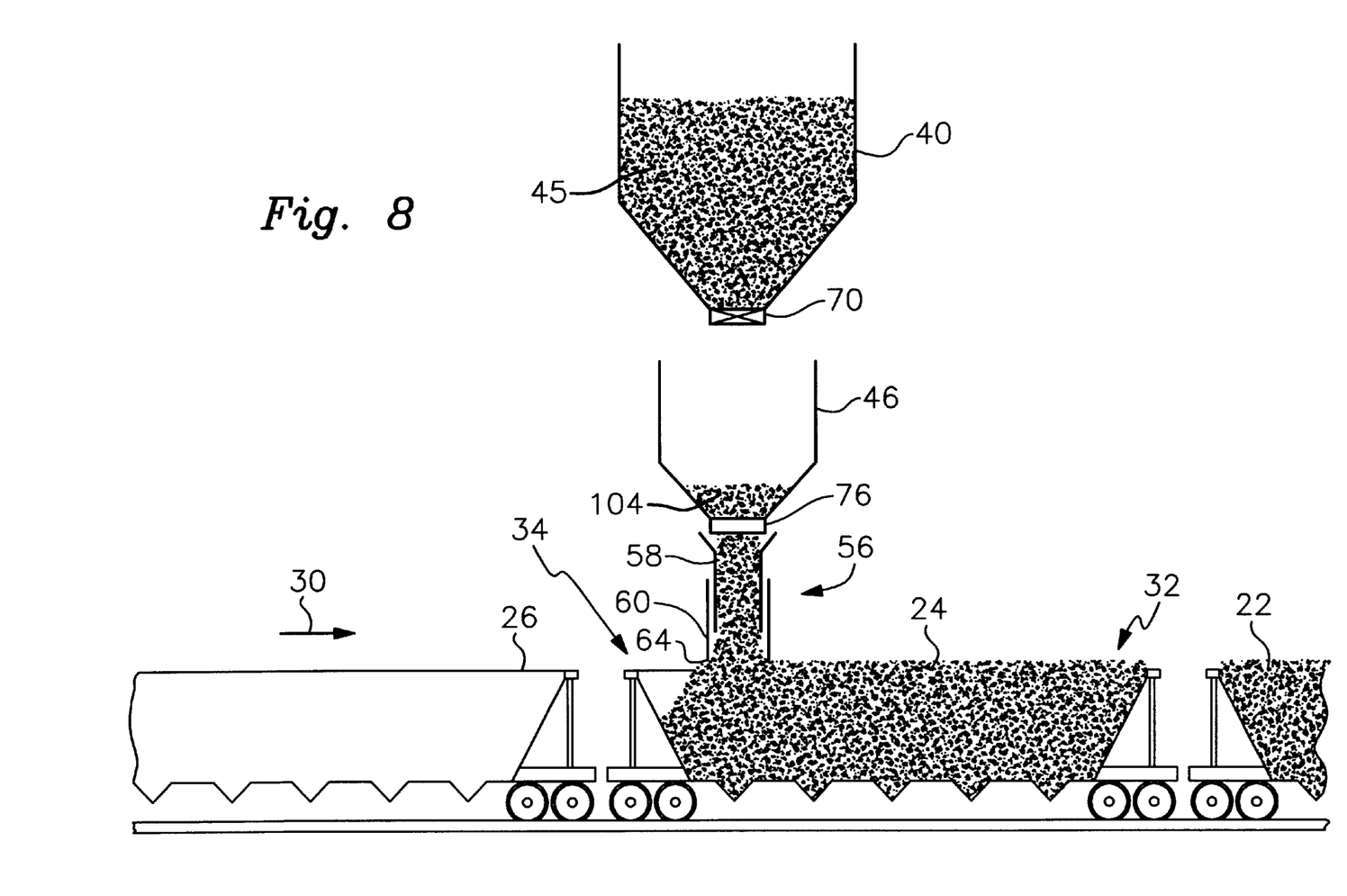
FIG. 8 depicts the third batch being discharged.

FIG. 8 depicts the third batch 104 being discharged through the discharge gate 76 and loading chute 56 into the railroad car 24. When the weigh bin 46 is completely emptied of the third batch 104, the discharge gate 76 is closed, and the entire process is repeated to load the next car 26, in the same manner as has just been described beginning with FIG. 2. Still referring to FIG. 8, coal flows from the loading chute 56 until the railroad car 24 is completely filled, which coincides with the complete emptying of the loading chute 56. The lower section 60 of the loading chute 56 is raised, if required, so as to clear the ends of the cars 24 and 26.

There are several factors to be taken into account and which contribute to the surprising economics of three-batch coal loadout systems embodying the invention, as discussed next below.

As a preliminary observation, the first batch 100 cannot be too small. The first batch 100 must be sufficient to load the front portion of an initially-empty railroad car all the way up to the discharge end 64 of the loading chute 56 so as to achieve a "plugged flow condition" such that the rate that coal flows out of the loading chute 56 into the railroad car is effectively controlled by forward movement of the train 28 and car, while in addition leaving enough coal in the loading chute 56 so as to maintain a continuous flow of coal out of the loading chute 56 during an interval between when the weigh bin 46 is emptied of the first batch 100 and the weigh bin 46 is charged with the second batch 102, and the discharge gate 76 opened, so that a constant load profile is maintained in the railroad car 24. Although the first batch should be somewhat in excess of what is sufficient to ensure reliable loading without gaps, designing equipment for a larger first batch than is actually required increases the equipment and facility cost, diminishing the advantages of the invention. Accordingly, in the exemplary embodiment for loading railroad cars with 120 tons (109 metric tons) of coal each, the weight of the first batch is 45 tons (41 metric tons). This is significantly less than the typically 60-ton (54 metric ton) first batch which would be made up in a two-batch system.

Thus, the invention is based in part on a recognition that, in a multiple-batch coal loadout system, the highest loadout rate is achieved when the initial batch is selected to be of a size which fills the front part of the car and also leaves enough coal in the loading chute 56 to maintain a constant load profile until the second batch 102 is made up and discharge of the second batch commenced, but without undue excess.

The most time-critical limitation is how quickly the second batch 102 can be made up in the weigh bin 46 and discharge of the second batch 102 commenced. Such discharge must commence before the loading chute 56 is completely emptied of the first batch 100. Otherwise, an undesirable and possibly unacceptable gap in the loading of coal into the railroad car 24 would result. In embodiments of the invention, the second batch 102 is made up relatively quickly. Thus, since the batching accuracy of the second batch 102 is not critical, the charging gate 70 is opened fully for maximum flow, and then simply closed when a single weight set point is reached.

The weight of the second batch 102 is a portion of the remaining material weight required to reach the target weight after the first weighed batch 100 is loaded into the railroad car 24. For example, if the target weight is 120 tons (109 metric tons) and the first batch 100 is 45 tons (41 metric tons), then the remaining material weight required is 120−45=75 tons (109−41=68 metric tons). The second batch 102 likewise may be 45 tons (41 metric tons). Even though it might appear to be advantageous to make the time-critical second batch 102 somewhat smaller so that it can be made up more quickly, in practice it is better to make the third batch 104 the smallest batch. The time penalty in making the second batch 102 weigh 45 tons (41 metric tons) rather than, for example one-half the remaining material weight required, is not severe. Precision batching takes less time with a smaller batch, or, stated in another way, a smaller batch can be made up with greater precision than a larger batch in a given amount of time.

In this example, the first and second batches 100 and 102 total 90 tons (82 metric tons), and so a third batch 104 of only 30 tons (27 metric tons) is required to reach the target weight of 120 tons (109 metric tons) after the first and second batches 100 and 102 are weighed and loaded into the railroad car 24.

While the precision to which the third batch 104 can be made up is critical, the speed is not. Thus, unlike when the first batch 100 is discharged, the second batch 102 does not enter an empty car 24 and loading chute 56. The second batch 102 is not discharged from the weigh bin 46 as fast as is the first batch 100. At the point in time when the weigh bin 46 becomes empty of the second batch 100 and the discharge gate 76 is closed, the loading chute 56 is essentially full of coal. Accordingly, when the third batch 104 is made up in the weigh bin 46, there is relatively more time to do so without resulting in a gap in the flow of coal into the railroad car 24, due to a maximized buffering effect of the loading chute 56. This results in sufficient time to modulate the closing of the charging gate 70 for precision batching as is described hereinabove with reference to FIG. 7, notwithstanding the additional five seconds typically required for precision batching.

While exemplary embodiments of the invention have been illustrated and described herein, it is realized that numerous modifications and changes will occur to those skilled in the art. It is therefore to be understood that the appended claims are intended to cover all such modifications and changes that fall within the true spirit and scope of the invention.

What is claimed is:

1. A multiple-batch method for loading a moving railroad car from front to back with a target weight of particulate material employing a loadout system including a surge bin, a weigh bin positioned below the surge bin, a controlled charging gate for charging batches of particulate material from the surge bin into the weigh bin, and a controlled discharge gate for discharging particulate material from the weigh bin through a loading chute having a discharge end into the railroad car, said method comprising the steps of:

as the railroad car approaches the loading chute, charging the weigh bin with a first weighed batch of material sufficient to fill a front portion of the railroad car up to the discharge end of the loading chute so that subsequent flow of material out of the loading chute is controlled by forward movement of the car and to leave a quantity of material in the loading chute sufficient to maintain a continuous flow of material into the railroad car during an interval between when the weigh bin is emptied of the first batch and the weigh bin is charged with a second weighed batch of material;

discharging the first batch from the weigh bin;

while material from the first batch is flowing from the loading chute into the railroad car, charging the weigh bin with the second batch, the weight of the second batch being a portion of the remaining material weight required to reach the target weight after the first weighed batch is loaded into the railroad car, and the second weighed batch being sufficient to leave a quantity of material in the loading chute sufficient to maintain a continuous flow of material into the railroad car during an interval between when the weigh bin is emptied of the second batch and the weigh bin is charged with a third weighed batch of material;

discharging the second batch from the weigh bin;

while material from the second batch is flowing from the loading chute into the railroad car, charging the weigh bin with the third batch, the weight of the third batch being what is required to reach the target weight after the first and second weighed batches are weighed and loaded into the railroad car; and discharging the third batch from the weigh bin.

2. The method of claim 1, wherein the step of charging the weigh bin with the third batch is performed with greater precision than the steps of charging the weigh bin with the first and second batches.

3. The method of claim 2, wherein, during the step of charging the weigh bin, the charging gate is closed in stages.

4. A loadout system for loading successive railroad cars of a moving train with respective target weights of particulate material, said system comprising:

a surge bin;

a weigh bin positioned below said surge bin, and at least one transducer connected to said weigh bin for measuring the weight of said weigh bin and particulate material contained therein, said at least one transducer having a weighing transducer output;

a controlled charging gate for charging batches of particulate material from said surge bin into said weigh bin;

a loading chute positioned below said weigh bin for conveying particulate material from said weigh bin into the railroad cars, said loading chute having a discharge end;

a controlled discharge gate for discharging particulate material from said weigh bin;

a controller connected to said transducer output for determining the weight of said weigh bin and particulate material contained therein, connected to said charging gate for controlling the charging of said weigh bin, and connected to said discharge gate for controlling discharging from said weigh bin, said controller operable, as an individual railroad car approaches said loading chute, to open said charging gate, while monitoring said weighing transducer output, so as to charge said weigh bin with a first weighed batch of material sufficient to fill a front portion of the individual railroad car up to said discharge end of said loading chute so that subsequent flow of material out of the loading chute is controlled by forward movement of the individual railroad car and to leave a quantity of material in said loading chute sufficient to maintain a continuous flow of material into the individual railroad car during an interval between when said weigh bin is emptied of the first batch and said weigh bin is charged with a second weighed batch of material, and then to close said charging gate, to open said discharge gate, and then to close said discharge gate when said weigh bin is empty, while material from the first batch is flowing from said loading chute into the individual railroad car, to open said charging gate, while monitoring said weighing transducer output, so as to charge said weigh bin with the second weighed batch, the weight of the second batch being a portion of the remaining material weight required to reach the target weight for the individual railroad car after the first weighed batch is loaded into the individual railroad car, and the second weighed batch being sufficient to leave a quantity of material in said loading chute sufficient to maintain a continuous flow of material into the individual railroad car during an interval between when said weigh bin is emptied of the second batch and said weigh bin is charged with a third weighed batch of material, and then to close said charging gate, to open said discharge gate, and then to close said discharge gate when said weigh bin is empty, while material from the second batch is flowing from said loading chute into the individual railroad car, to open said charging gate, while monitoring said weighing transducer output, so as to charge said weigh bin with the third weighed batch, the weight of the third batch being what is required to reach the target weight for the individual railroad car after the first and second weighed batches are weighed and loaded into the individual railroad car, and then to close said charging gate, and to open said discharge gate, and then to close said discharge gate when said weigh bin is empty.

5. The loadout system of claim 4, wherein:

said charging gate is capable of selective opening sizes in order to modulate the flow of material into said weigh bin; and wherein said controller is operable, when the weigh bin is being charged with the third weighed batch, to close said charging gate in stages so as to charge said weigh bin with the third batch with greater precision than the first and second batches.

6. The loadout system of claim 4, wherein said surge bin is supplied with particulate material on a substantially continuous basis by a particulate transport system.

7. The loadout system of claim 4, wherein said loading chute is telescoping so that said discharge end can selectively be lowered into and withdrawn from railroad cars.

8. The loadout system of claim 4, wherein said weigh bin has a capacity sufficient to accommodate the first weighed batch of a largest design railroad car.

9. The loadout system of claim 4, wherein said surge bin has a sufficient capacity so as to never become completely empty while the weigh bin is repeatedly charged during the loading of the cars, and while said surge bin is supplied with particulate material on a substantially continuous basis by a particulate transport system.

* * * * *